Patented Apr. 19, 1932

1,854,461

UNITED STATES PATENT OFFICE

HENRY DREYFUS, OF LONDON, ENGLAND

DYEING OF MATERIAL CONTAINING CELLULOSE DERIVATIVES

No Drawing. Application filed January 22, 1927, Serial No. 162,937, and in Great Britain November 23, 1926.

This invention relates to the dyeing, printing or stencilling of threads, yarns, knitted or woven fabrics, or other products made of or containing cellulose acetate or other organic acid esters of cellulose, such for example as cellulose formate, propionate, or butyrate, or the product obtained by the treatment of alkalized cellulose with p-toluene sulphochloride (e. g. the product known as "immunized cotton"), or made of or containing cellulose ethers, such as methyl, ethyl, or benzyl cellulose, or the corresponding condensation products of cellulose and glycols or other polyhydric alcohols, all of which are hereinafter referred to as organic substitution derivatives of cellulose.

According to the present invention materials made of or containing one or more of the said organic substitution derivatives of cellulose are dyed or otherwise colored with coloring matters or compounds comprising one or more aliphatic hydroxy-ether or hydroxy-thioether groupings, that is to say with compounds in which an aryl dye nucleus is linked through oxygen or sulphur with an aliphatic side chain or chains containing one, two, three or more hydroxy groups. Alternatively such coloring matters may be produced on the fibre or material.

The use of the coloring matters or compounds comprising hydroxy-thio-ether groupings forms the subject matter of a divisional application Serial Number 242,976 filed Dec. 27, 1927 and is not included within the claims of the present application.

Such coloring matters or compounds may readily be prepared, for example by treating a phenolic or thiophenolic body or salts thereof with a halohydrin, such for example as ethylene chlorhydrin, propylene chlorhydrins, glyceryl chlorhydrins, glyceryl dichlorhydrins, epichlorhydrin, chlorbutylene glycol, erythrol dichlorhydrin, mannitol mono- or dichlorhydrin and the like, or an alkylene oxide, such as ethylene oxide or propylene oxide, or a ketone such as acetone.

They may further be prepared by fusing aliphatic hydroxy mercaptans or glycols with a nitro derivative of an aryl dye nucleus or component thereof in presence of caustic alkali or by treating a halogen derivative of an aryl dye nucleus or component thereof with an aliphatic hydroxy mercaptan.

The following examples of compounds for use according to the present invention and of the methods of preparing them are intended to illustrate the invention and not to be in any way limitative.

A. ANTHRAQUINONE DYESTUFFS

Example 1

1-amino-4-hydroxyanthraquinone is diazotized in concentrated sulphuric acid solution, the diazo-hydroxy-anthraquinone sulphate dissolved in water and heated with potassium thiocyanate solution. The hydroxyanthraquinone thiocyanate is heated under a reflux with caustic soda in presence of methylated spirit to obtain the corresponding mercaptan which is then precipitated with hydrochloric acid and condensed with glyceryl α-chlorhydrin. The product is reduced to the leuco state with caustic soda and hydrosulphite and the dried leuco body refluxed on a water bath with methylamine. After oxidation the dyestuff obtained has the formula,

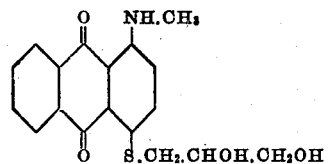

Example 2

1-acetylamino-4-hydroxyanthraquinone is condensed with ethylene chlorhydrin to yield the dyestuff

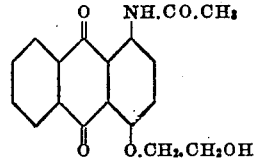

Example 3

Chloranthrapyridone is condensed with monothioglycerol ($CH_2OH.CHOH.CH_2SH$) to obtain the dyestuff.

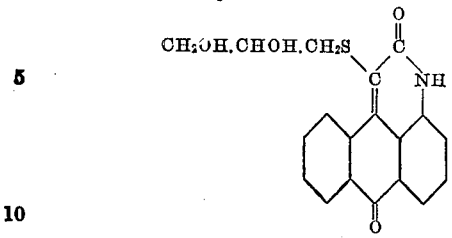

B. Azo Dyestuffs

Example 4 p-nitrophenol is condensed with chlorbutylene glycol, the product reduced, diazotized and coupled with β-naphthol in alkaline solution to obtain the dyestuff

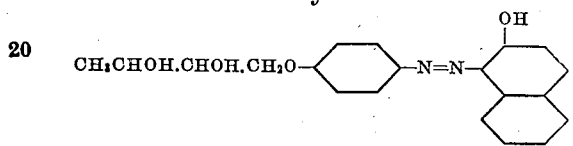

Example 5 p-nitrothiophenol is condensed with β-ketopropyl alcohol ($CH_3.CO.CH_2OH$) by warming in benzene. The product is reduced with stannous chloride and hydrochloric acid to the amino compound which is then diazotized, coupled with α-napthylamine, re-diazotized and coupled with phenol to obtain the dyestuff

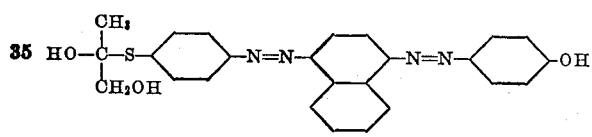

C. Producing Dyestuffs on the Material

Example 6

To dye cellulose acetate knitted fabric. A dyebath is made up (volume 30:1 on the goods) with aminoazobenzeneglyceryl ether (prepared by condensing p-nitrophenol with glyceryl α-chlorhydrin, reducing, diazotizing and coupling with aniline). The goods are entered and the bath gradually heated until exhausted. The goods are rinsed, worked in a bath of nitrite and hydrochloric acid, rinsed and developed in the cold with dimethyl aniline to produce a scarlet shade.

With regard to the dyestuffs or compounds to be applied according to the present invention, it may be stated that the greater the number of hydroxy groups in the side chain or chains, the greater will be the solubility of the dyestuffs or compounds in water and for obvious reasons the use of such water soluble compounds is to be preferred.

The dyestuffs may be applied to the goods in solution (where they are sufficiently soluble), or in aqueous suspension or they may be brought into colloidal solution by any of the methods known in the art such as by grinding (for example in colloid mills), by dissolving in a solvent and pouring into water containing or not containing protective colloids, by pretreating with solubilizing agents, or by other methods. Of the solubilizing agents which are suitable for obtaining such dispersions I may mention those described in U. S. Patents 1,618,413 and 1,618,414 issued Feb. 22, 1927, 1,690,481 issued Nov. 6, 1928, 1,694,413 issued Dec. 11, 1928 and 1,716,721 issued June 1, 1929 and U. S. application 134,138 filed Sept. 7, 1926, viz. bodies of oily or fatty characteristics, namely higher fatty acids or sulphonated or other derivatives thereof containing salt-forming groups, such as sulphoricinoleic or other sulphonated fatty acids or salts of such acids or bodies, for instance their alkali or ammonium salts, used alone or in conjunction with auxiliary solvents as described in U. S. Patent 1,690,481 and application S. No. 152,517; carbocyclic compounds containing in their structure one or more salt-forming groups or salts of such compounds; sulphoaromatic fatty acids or salts thereof; and soluble resin soaps or sodium or other soluble salts or soaps of resin acids.

Though in the above description dyestuffs belonging to particular series have been given and further aliphatic side chains containing hydroxy only have been described, it is to be understood that the invention extends to the use of dyestuffs of any series and containing aliphatic side chains which in addition to one, two, three or more hydroxy groups may contain any other desired substituents.

The invention further comprises the dyeing or otherwise coloring of mixed goods comprising for example, in addition to one or more of the organic substitution derivatives, silk, wool, or cellulose fibres natural or artificial such as cotton or the cellulose type of artificial silk, in solid or contrasting shades according to the affinity of the non-ester and non-ether portion of the goods. The goods may be dyed with other dyestuffs for the non-ester and non-ether portion thereof either before, after or together with the dyestuffs of the present invention.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one glyceryl ether grouping.

2. Process for dyeing material comprising an organic substitution derivative of cellulose, comprising dyeing the material with an aqueous solution of a coloring compound which comprises at least one glyceryl ether grouping.

3. Process for dyeing material comprising an organic substitution derivative of cellulose, comprising dyeing the material with an anthraquinone coloring compound which comprises at least one aliphatic hydroxy ether grouping.

4. Process for dyeing material comprising an organic substitution derivative of cellulose, comprising dyeing the material with an anthraquinone coloring compound which comprises at least one glyceryl ether grouping.

5. Process for dyeing material comprising an organic substitution derivative of cellulose, comprising dyeing the material with an aqueous solution of an anthraquinone coloring compound which comprises at least one aliphatic hydroxy ether grouping.

6. Process for dyeing material comprising an organic substitution derivative of cellulose, comprising dyeing the material with an aqueous solution of an anthraquinone coloring compound which comprises at least one glyceryl ether grouping.

7. Process for dyeing material comprising an organic substitution derivative of cellulose, comprising dyeing the material with an aqueous colloidal solution of an anthraquinone coloring compound which comprises at least one aliphatic hydroxy ether grouping.

8. Process for dyeing material comprising cellulose acetate, comprising dyeing the material with a coloring compound which comprises at least one glyceryl ether grouping.

9. Process for dyeing material comprising cellulose acetate, comprising dyeing the material with an aqueous solution of a coloring compound which comprises at least one glyceryl ether grouping.

10. Process for dyeing material comprising cellulose acetate, comprising dyeing the material with an anthraquinone coloring compound which comprises at least one aliphatic hydroxy ether grouping.

11. Process for dyeing material comprising cellulose acetate, comprising dyeing the material with an anthraquinone coloring compound which comprises at least one glyceryl ether grouping.

12. Process for dyeing material comprising cellulose acetate, comprising dyeing the material with an aqueous solution of an anthraquinone coloring compound which comprises at least one aliphatic hydroxy ether grouping.

13. Process for dyeing material comprising cellulose acetate, comprising dyeing the material with an aqueous solution of an anthraquinone coloring compound which comprises at least one glyceryl ether grouping.

14. Process for dyeing material comprising cellulose acetate, comprising dyeing the material with an aqueous colloidal solution of an anthraquinone coloring compound which comprises at least one aliphatic hydroxy ether grouping.

15. Materials comprising organic substitution derivatives of cellulose, colored with an anthraquinone dyestuff containing at least one aliphatic hydroxy ether grouping.

16. Materials comprising organic substitution derivatives of cellulose acetate, colored with an anthraquinone dyestuff containing at least one aliphatic hydroxy ether grouping.

17. Materials comprising organic substitution derivatives of cellulose colored with a dyestuff containing at least one glyceryl ether grouping.

18. Materials comprising cellulose acetate colored with a dyestuff containing at least one glyceryl ether grouping.

In testimony whereof I have hereunto subscribed my name.

HENRY DREYFUS.